United States Patent
Kempisty

(10) Patent No.: US 6,714,264 B1
(45) Date of Patent: Mar. 30, 2004

(54) DIGITAL TELEVISION CHANNEL SURFING SYSTEM

(75) Inventor: Mark S. Kempisty, Richboro, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 09/652,760

(22) Filed: Aug. 31, 2000

(51) Int. Cl.⁷ .................................. H04N 5/50

(52) U.S. Cl. .................. 348/732; 348/734; 348/554

(58) Field of Search ................... 348/731, 732, 348/554, 725, 726, 558, 734, 565; 725/38

(56) References Cited

U.S. PATENT DOCUMENTS

| | | |
|---|---|---|
| 5,231,494 A | 7/1993 | Wachob |
| 5,532,748 A | 7/1996 | Naimpally |
| 5,537,152 A | 7/1996 | Ishikawa |
| 5,537,153 A | 7/1996 | Shigihara |
| 5,633,683 A | 5/1997 | Rosengren et al. |
| 5,752,160 A | 5/1998 | Dunn |
| 5,818,936 A | 10/1998 | Mashayekhi |
| 5,828,416 A | 10/1998 | Ryan |
| 5,838,812 A | 11/1998 | Pare, Jr. et al. |
| 5,847,703 A | 12/1998 | Teicher et al. |
| 5,926,230 A | 7/1999 | Niijima et al. |
| 5,933,192 A * | 8/1999 | Crosby et al. ............. 348/387 |
| 5,963,908 A | 10/1999 | Chadha |
| 6,006,333 A | 12/1999 | Nielsen |
| 6,118,498 A * | 9/2000 | Reitmeier .................. 348/225 |
| 6,137,539 A * | 10/2000 | Lownes et al. ............. 348/569 |
| 6,212,680 B1 * | 4/2001 | Tsinberg et al. ............. 725/39 |
| 6,285,408 B1 * | 9/2001 | Choi et al. ................. 348/555 |
| 6,334,217 B1 * | 12/2001 | Kim ............................ 725/38 |
| 6,369,861 B1 * | 4/2002 | Lownes ..................... 348/731 |
| 6,519,011 B1 * | 2/2003 | Shendar .................... 348/731 |

FOREIGN PATENT DOCUMENTS

| | | | |
|---|---|---|---|
| EP | 0717339 A2 | 6/1996 | |
| EP | 0863491 A1 | 9/1998 | |
| WO | WO 00/01213 | * 1/2000 | .......... H09N/5/445 |

OTHER PUBLICATIONS

European Search Report, Mar. 14, 2003.
"Enterprise Single Logon Product Description"; Enterprise Connectivity Solutions, Inc.; Oct. 19, 1996; http://www.enterpriseconnect.com/es1.html.

* cited by examiner

Primary Examiner—Victor R. Kostak
(74) Attorney, Agent, or Firm—RatnerPrestia

(57) ABSTRACT

A digital television receiver that decodes multiple programs concurrently to reduce the amount of time needed to display an adjacent channel in a channel surfing operation includes a single transport decoder and a single video/audio decoder. The transport decoder decodes multiple transport streams in a single channel. Each transport stream represents a respectively different minor channel transmitted in the major channel. When a channel change operation occurs, the audio/video decoder selects the next transport stream that is provided by the transport decoder. In another embodiment of the invention, the single video/audio decoder includes multiple buffers and concurrently decodes multiple program streams. When a program switch occurs, the program stream for a next buffer is provided to the video display. In yet another embodiment, the television receiver includes multiple tuners, each capable of receiving a respective channel. Each tuner is coupled to a respective transport decoder and each transport decoder is coupled to a respective decoder. In this embodiment of the invention, when a channel switch occurs, the video signal is immediately available at the output of one of the decoders and is displayed. At the same time, one of the tuners is tuned to the next channel in the sequence in anticipation of a subsequent channel switch operation.

14 Claims, 6 Drawing Sheets

DIGITAL TELEVISION CHANNEL SURFING SYSTEM

BACKGROUND OF THE INVENTION

The present invention concerns digital television receivers and in particular a receiver including multiple program decoders and/or multiple tuners to allow programs from successive channels to be quickly displayed and selected.

Digital television programming is available from many sources, these include satellite broadcasts, digital cable systems and terrestrial broadcasts systems. A viewer connected to a digital cable system may, for example, be able to receive up to 500 channels. This is possible because the digital television signals are compressed to eliminate redundancies from line to line and frame to frame and, thus, the required bandwidth needed to transmit the signals is also reduced.

The compression technology used to achieve this efficiency, however, also makes the signals difficult to decode and display. A typical motion compensated predicted frame, for example, is encoded in many steps. First corresponding image data from a previous frame, as determined by a motion compensation processor, is subtracted from the image data in the current frame. Next, this difference data is encoded using a discrete cosine transform process. The discrete cosine transform coefficients are applied to a variable quantiser to reduce the number of bits used to represent each coefficient. Next, the quantized coefficients are processed through a variable length coder and run length coder to further reduce the number of bits needed to represent the video signal. The resulting bit-stream is packetized into variable-length program elementary stream (PES) packets which are further decomposed into fixed-length transport packets. The packetized bit-stream is further annotated with information needed to recover the bit-stream from the packets. Finally, forward error correction code information is added to the signal. The encoded signal is then modulated onto a radio frequency (RF) virtual side band carrier signal for terrestrial broadcast video systems or on to a quadrature amplitude modulated carrier for cable broadcast systems.

The decoding operations to reproduce the video signal must reverse the operation performed by the encoder in order to produce a decoded signal. A typical digital television receiver locks a tuner on to the pilot signal of the RF digital television signal then it demodulates the RF television signal to produce a baseband encoded television signal. Next, the forward error correction coding is processed to recover the transport packets. The transport packets are then processed to reproduce the PES packets and the PES packets are processed to reproduce the elementary bit-stream. The elementary bit-stream for the video signal is applied to a variable length decoder and run-length decoder which produce fixed length code values representing the frequency domain coefficients as well as other side information (e.g. motion vectors) needed to decode the video signal. Next, the fixed length coefficient values are applied to an inverse quantiser and to an inverse discrete cosine transform processor to reproduce pixel values.

If the frame being decoded is a motion compensated frame, the pixel values are differential pixel values that are referenced to a pixel values in a prior frame or field as indicated by a motion vector. This motion vector is received as part of the side information in the transmitted signal. The pixels represented by the motion vector are recovered and added to the differential pixels in order to reproduce the video signal.

Similar digital encoding techniques are used for the audio portion of the television signal.

The complex coding scheme used for digital television programming produces great coding efficiency but causes delay in the reproduction of a video signal. The time between when a television tuner is first tuned to a digital television channel and the time that the video information is displayed may be as long as 1 to 4 seconds.

Channel surfing is a process by which a viewer successively tunes a television receiver to one channel after another in order to find a program that he or she wishes to watch. On conventional analog television receivers, the time between the display of images for successive channels in a channel surfing operation is less than one second. The increase in the amount of time needed to display images from successive digital television programs may frustrate even the most patient channel surfer.

In order to over come the problem of channel surfing many cable systems provide electronic program guides (EPG). These guides allow a viewer to bring up a description of programming currently available on multiple channels, typically in a grid form. By visually scanning the grid a viewer may determine the programming on any of a number of channels and tune to a channel by selecting an item from the grid. It is difficult, however, to succinctly describe a television program in a grid format. Consequently many viewers perceive these guides as boring or of limited utility.

Another system which has been proposed is described in U.S. Pat. No. 5,532,748 entitled Hybrid Analog/Digital Television Transmission System. This patent describes a system that includes an analog video signal along with the digital television signal to produce a hybrid television signal for use during channel change operations. When a viewer using this system changes channels the low-resolution analog signal is displayed at first followed by the digital signal when the digital decoder has enough information. This system, however, does not allow digital systems to retain the high quality picture during channel surfing which users have come to expect from digital systems.

SUMMARY OF THE INVENTION

The present invention is embodied in a digital television receiver that decodes multiple programs concurrently to reduce the amount of time needed to display an adjacent channel in a channel surfing operation.

One embodiment of the receiver employs a single transport decoder and a single video/audio decoder. The transport decoder concurrently decodes multiple transport streams in a single channel. Each transport stream represents a respectively different minor channel transmitted in the major channel. When a channel change operation occurs, the audio/video decoder selects the next transport stream that is provided by the transport decoder.

According to a second embodiment of the invention, the single video/audio decoder includes multiple buffers and concurrently decodes multiple program streams. When a program switch occurs, the program stream for a next buffer is provided to the video display.

According to another embodiment of the invention, the television receiver includes multiple tuners, each capable of receiving a respective channel. Each tuner is coupled to a transport decoder and each transport decoder is coupled to a respective video/audio decoder. In this embodiment of the invention, when a channel switch occurs, the video signal is immediately available at the output of one of the decoders and is displayed. At the same time, one of the tuners is tuned to the next channel in the sequence in anticipation of a subsequent channel switch operation.

DETAILED DESCRIPTION

Figure 1:
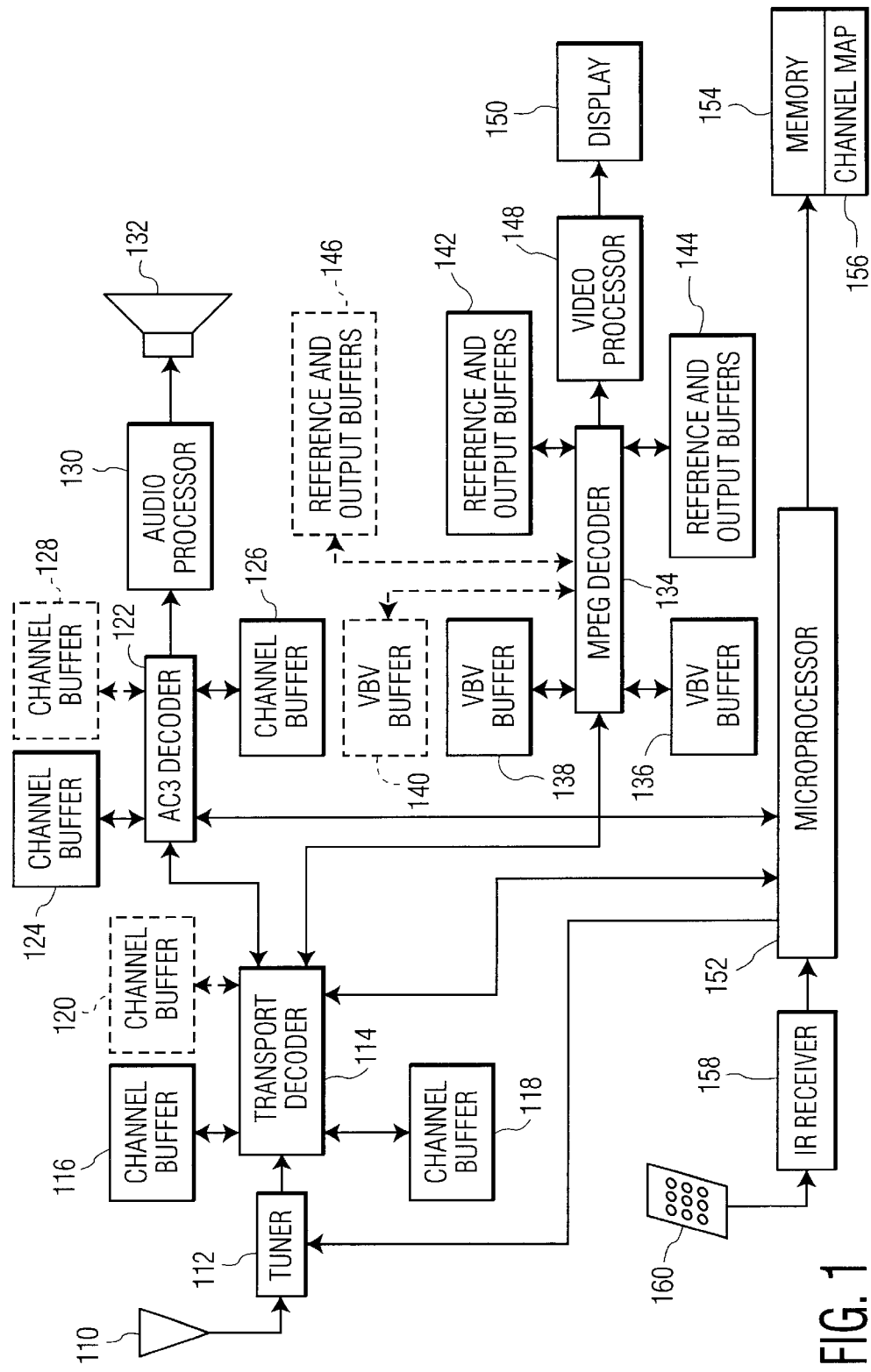
FIG. 1 is a block diagram of a television receiver according to a first embodiment of the invention.

FIG. 1 is a block diagram of a first exemplary embodiment of the invention. The television receiver shown in FIG. 1 includes a single antenna 110 and a tuner 112. Although the antenna and tuner are shown as receiving a terrestrially broadcast digital television (DTV) signal, it is contemplated that the tuner 112 may receive cable signals or signals from a satellite receiver (not shown).

The tuner 112 demodulates the DTV signal and applies the baseband DTV signal to a transport decoder 114. In the exemplary embodiment of the invention the transport decoder 114 includes two channel buffers 116 and 118. Each channel buffer includes a buffer memory holding respective audio, video and data channels for a respective television program. In addition to the channel buffers 116 and 118, the transport decoder 114 may include additional channel buffers such as buffer 120 shown in phantom.

When the television receiver receives a multi-program channel, the transport decoder 114 applies signals from respective ones of the programs to the respective channel buffers 116, 118 and, optionally, 120. Buffer 116 may, for example, hold the audio, video and data channels for the last minor channel in the multi-channel bit-stream, channel buffer 118 may hold audio, video and data programs for the first minor channel in the multi-channel stream and channel buffer 120 may hold the audio, video and data programs for the second minor channel.

The transport decoder 114 is controlled by a microprocessor 152 which is coupled to an infra red (IR) receiver 158 or to controls (not shown) on the front panel (not shown) of the television receiver. The IR receiver 158 receives command signals from a remote control device 160. When the user presses a channel up button on the remote control device 160, the IR receiver receives the command and provides it to the microprocessor 152. Likewise, when the user presses the channel up button on the front panel, the microprocessor 152 receives the command directly. Microprocessor 152, in response to the channel-up command, causes the tuner 112 to tune to the next higher frequency as indicated by the channel map 156 in a memory 154 coupled to the microprocessor 152. If the new channel tuned by the tuner 112 is a multi-program channel, the transport decoder 114 immediately begins to decode two or three of the minor channels in the multi-program bit-stream.

Data for all two or three concurrently decoded minor channels is provided to an AC3 audio decoder 122 and an MPEG video decoder 134. The exemplary AC3 decoder 122 includes two channel buffers 124 and 126 and an optional third channel buffer 128. Each of these channel buffers holds a decoded audio signal. When the viewer selects a particular minor channel from the multi-program bit-stream, the AC3 decoder 122 is configured to provide the decoded audio signal for the selected channel from one of its buffers 124, 126 or 128 to the audio processor 130. The audio processor controls the audio signal, for example, by equalization or volume control to produce an audio output at the speakers 132.

Transport decoder 114 simultaneously provides the video and data components of the decoded television signals to the MPEG decoder 134. MPEG decoder 134 stores the data received from the transport decoder into respective video buffering verifier (VBV) buffers 136 and 138, and optionally 140. These buffers provide a variable length bit-stream to the MPEG decoder for each of the respective minor channels in the multi-program channel. The MPEG decoder 134 is also coupled to respective reference and output buffers 142, 144 and optionally 146. Each of these buffers holds reference frames used by the MPEG decoder to reproduce motion predictively encoded video fields or frames and an output buffer which holds the output video signal currently being provided to the video processor 148. The video processor 148 processes the output signal to adjust, for example, color and tint and provides the video output signal to a display device 150.

In the embodiment of the invention in which only two channel buffers are used by the transport decoder and AC3 decoder and only two VBV buffers and reference and output buffers are used by the MPEG decoder 134, channel surfing is only facilitated among the minor channels of a multi-program channel and only in one direction. Thus, for example, a user may quickly surf through channels in a upward direction (increasing minor channel numbers) or in a downward direction (decreasing minor channel numbers) but may not switch between these during a given surfing operation without experiencing normal DTV decoding delays.

In operation, once the tuner 112 is tuned to a major channel that has minor channels, when the viewer presses the channel up button on the remote control 160 the microprocessor 152 causes the transport decoder 114 to reassign one of the channel buffers 116 and 118 to the next higher minor channel in the multi-program bit-stream. This causes the corresponding channel buffer in the 124 or 126 coupled to the AC3 decoder 122 to also switch to the next higher minor channel as well as the corresponding VBV buffer 136 or 138 and the corresponding reference and output buffer 142 and 144 coupled to the MPEG decoder 134. The buffers that are switched are the ones that were providing the signal which was being reproduced before the channel change command was received. When the channel up button is pressed, the microprocessor 152 controls the MPEG decoder 134 and the AC3 decoder 122 to immediately provide the audio signal from the next higher channel. This causes a shift in the channel buffer being used. If the optional buffers 120, 140 and 146 are used, the system shown in FIG. 1 may facilitate minor channel surfing in both the upward (greater channel numbers) and downward (lesser channel numbers) directions.

The exemplary embodiment of the invention shown in FIG. 1 facilitates surfing among the minor channels in a major channel but does not affect surfing among major channels.

Figure 2:
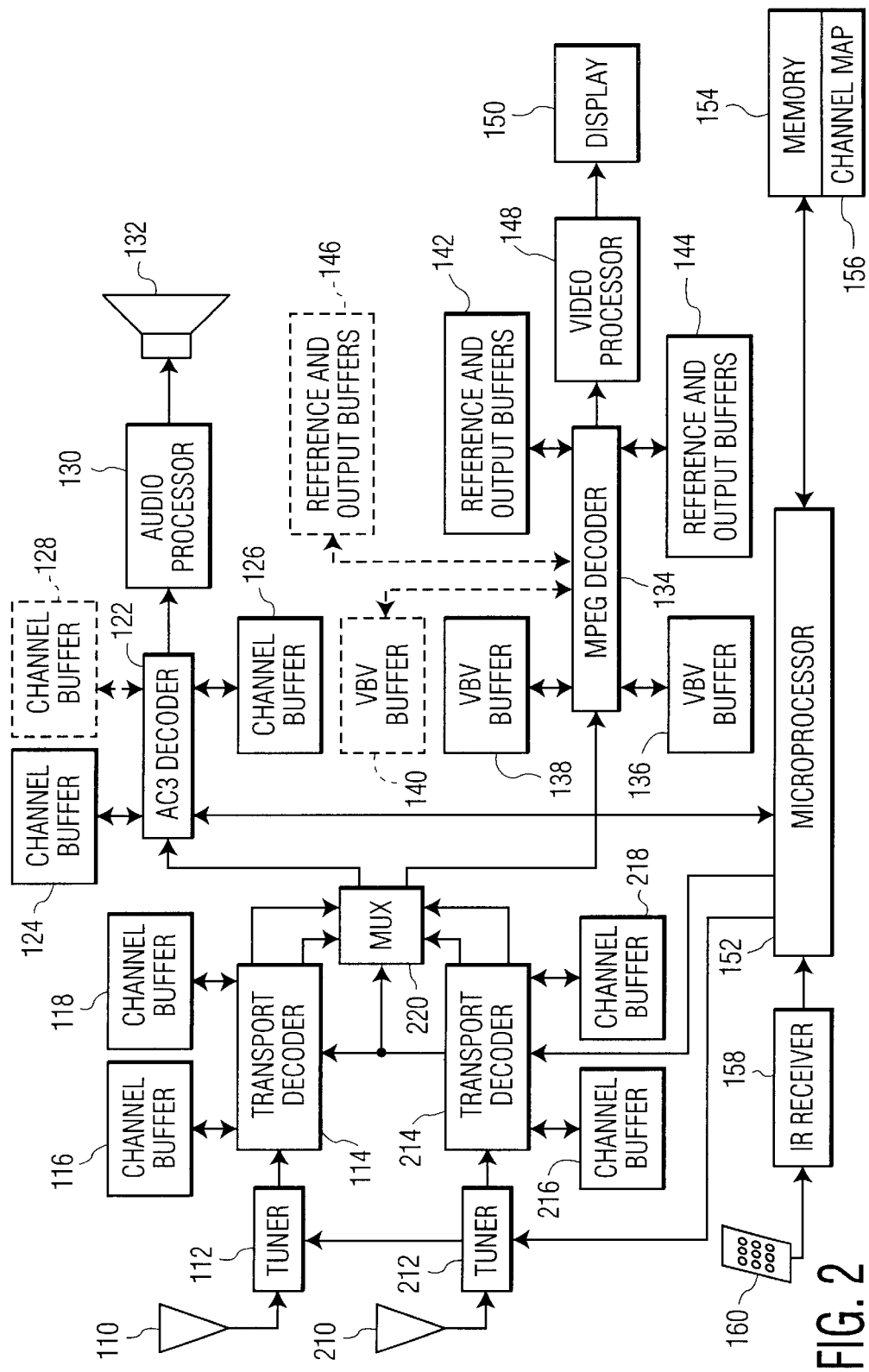
FIG. 2 is a block diagram of a television receiver in accordance with a second embodiment of the invention.

FIG. 2 is a block diagram of a second exemplary embodiment of the invention that allows viewers to surf both minor channels and major channels. The embodiment of the invention shown in FIG. 2 adds a second tuner 212 with its corresponding antenna 210, a second transport decoder 214 with its corresponding channel buffers 216 and 218 and a multiplexer 220.

Because the embodiment of the invention shown in FIG. 2 use only two tuners 112 and 212, it supports channel surfing in only one direction, either to higher numbered channels or lower numbered channels. It is contemplated that the surfing direction may be preprogrammed or it may be selectable by the viewer either as a part of the set up process or dynamically while the viewer is watching television programs.

The embodiment of the invention shown in FIG. 2 may be used to aid is channel surfing in two different ways. The first method uses two transport decoders 114 and 214 to concurrently decode DTV programs received on successive RF channels by tuners 112 and 212 respectively. If the viewer is watching a program provided by tuner 112 and transport decoder 114 and then selects a program in the channel that is being received and decoded by tuner 212 and transport decoder 214, the transport decoder 214 will have already decoded the bit-stream for that program. Accordingly, the microprocessor 152 controls the multiplexer 220 to provide the bit-stream to the AC3 decoder 122 and MPEG decoder 134. In this embodiment of the invention, only the transport decoding delay is avoided during channel surfing.

A second method for using the embodiment of the invention shown in FIG. 2 decodes separate bit-streams in each of the transport decoders 114 and 214 and, responsive to the microprocessor 152, provides both bit-streams to the AC3 decoder 122 and MPEG decoder 134 via the multiplexer 220. The decoder 122 decodes the two bit-streams, storing data for one bit-stream in the channel buffer 124 and for the other bit-stream in channel buffer 126 of AC3 decoder 122. The MPEG decoder 134 also concurrently decodes two bit-streams, storing the data for one program into VBV buffer 138 and reference and output buffers 142 while storing the data for the other program in the VBV buffers 136 and reference and output buffers 144. According to this second method, the microprocessor 152 controls the multiplexer 220 to provide data for both channels to the AC3 decoder 122 and MPEG decoder 134 in an interleaved manner such that both signals may be concurrently decoded.

In an exemplary embodiment of the invention, the AC3 decoder 122 and MPEG decoder 134 interact with the microprocessor 152 using, for example, high-water mark and low-water mark signals from the respective channel buffers and VBV buffers. For example, the microprocessor 152 may condition the multiplexer 220 to provide data from channel buffer 118 coupled to transport decoder 114 to the AC3 decoder 122 and MPEG decoder 134 until the respective channel buffer 124 and VBV buffer 136 reach their respective high-water mark pointers. When the decoders 122 and 134 signal the microprocessor 152 that these high-water mark values have been reached, the microprocessor 152 conditions the multiplexer 220 to provide bit-stream data from channel buffer 218 coupled to transport decoder 214. The AC3 decoder 122 is conditioned to store this data into channel buffer 126 and VBV buffer 136. Once the input data is stored into the respective channel buffer 124 or 126 and VBV 138 or 136, the decoder 122 and 134 may independently process the data to recover the output audio and video signals. The audio and video signals for the channel that is not selected are discarded while the signals for the selected channel are provided to the audio processor 130 and video processor 148.

The embodiment of the invention shown in FIG. 2 may operate in the same way as the embodiment shown in FIG. 1 to allow a viewer to surf through minor channels in a single major channel. For this type of surfing, a single tuner 112 may be used with its transport decoder 114 to process both minor channels. In this instance, the other tuner, 212 and transport decoder 214 may be tuned to process the next major channel according to the chosen surf direction, so that switching among both major and minor channels may be accomplished quickly.

The embodiment of the invention shown in FIG. 2 includes optional channel buffer 128, optional VBV buffer 140 and optional reference and output buffers 146, all shown in phantom. These buffers may be used, for example, to aid in the switching operation of both upward and downward surfing operations, at least for minor channels. When the system is operated in the first method described above, in which only the transport decoder delay is eliminated, it may be desirable to use these optional buffers to continue to decode and display the current program while loading new program information into the other two buffers to display both the newly selected program and the next program in the determined surf direction.

Figure 3:
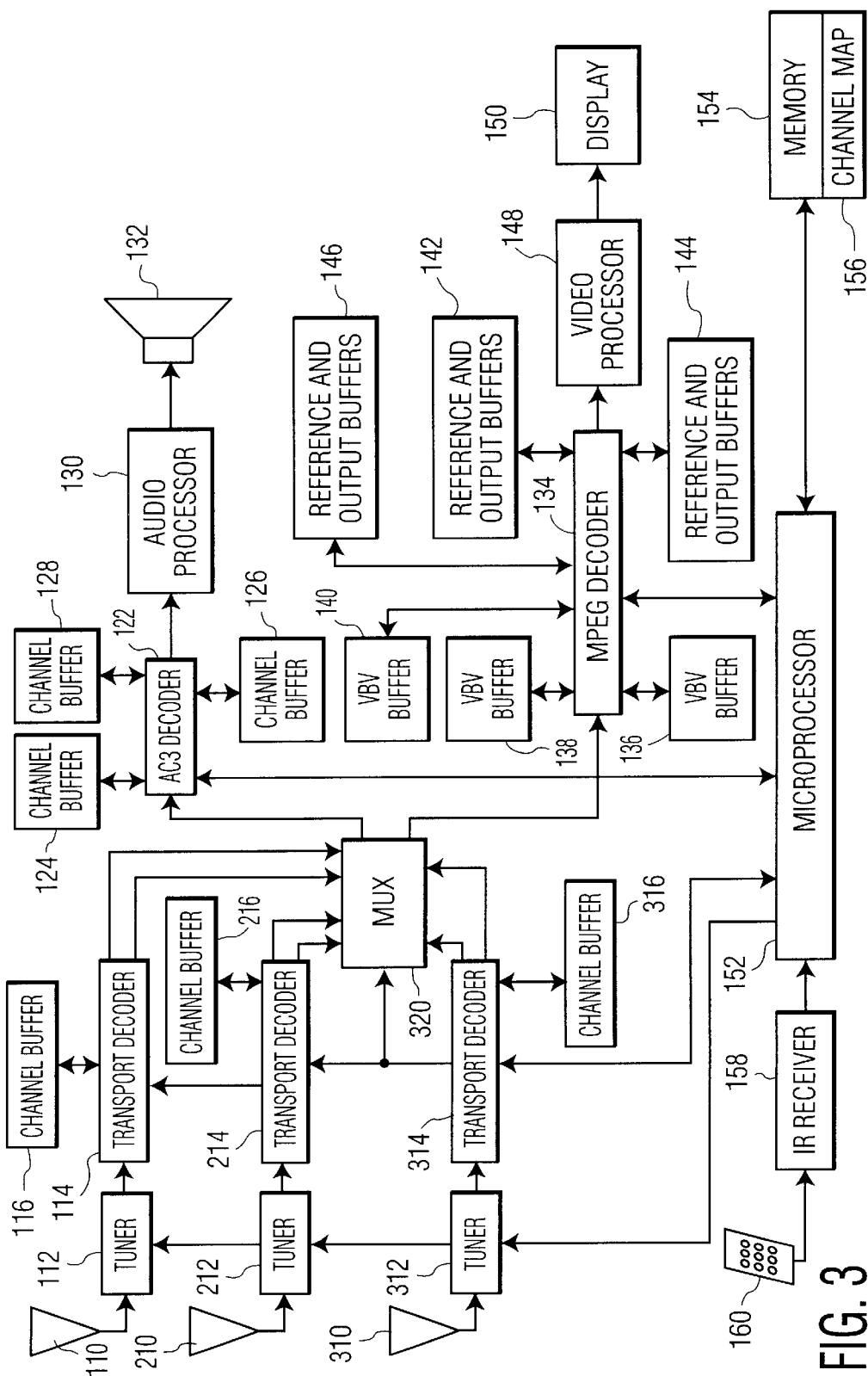
FIG. 3 is a block diagram of a television system in accordance with the third exemplary embodiment of the invention.

The exemplary embodiment of the invention shown in FIG. 3 augments the embodiment shown in FIG. 2 by adding a third tuner, 312, with an antenna 310 and transport decoder 314 having an associated channel buffer 316. The three transport decoders 114, 214 and 314 are coupled to respective input ports of a three port multiplexer 320. Also in the exemplary embodiment of the invention shown in FIG. 3 channel buffer 128, VBV buffer 140 and reference and output buffers 146 are no longer optional.

The embodiment of the invention shown in FIG. 3 operates in a manner similar to that shown in FIG. 2 except it is not restricted to a single surf direction. Because it uses three tuners, 112, 212, and 312, the embodiment of the invention shown in FIG. 3 may provide image and audio data from one channel while simultaneously obtaining image and sound data from channels immediately above and immediately below the one channel in the channel map 156.

As with the embodiment in FIG. 2, the embodiment shown in FIG. 3 may operate either to decode only the transport stream of the three channels or to provide the decoded transport stream of the three channels to the AC3 decoder 122 and MPEG decoder 134 concurrently. Using this second method, the channel buffers 124, 126 and 128 hold audio data from respectively different ones of the three channels. In the same way, the VBV buffers 136, 138 and 140 hold bit-stream data from each of the channels and the reference and output buffers 142, 144 and 146 hold decoded image data from the respective channels.

In the embodiment of the invention shown in FIG. 3, each transport decoder 114, 214 and 314 uses only one channel buffer 116, 216 and 316 respectively. Because the next surf channel is either immediately above or immediately below the current channel in the channel map 156, only three adjacent channels need to be decoded in order to provide full surfing capability. Accordingly only three tuners and three transport decoders, each with one channel buffer, are needed to implement the surf function. When the channel surfing function is used to display minor channels of a major channel, at least two of the tuners 112, 212 and 312 may be tuned to the same major channel while respectively different minor channels are decoded by the respective transport decoders 114, 214 and 314.

The embodiment of the invention shown in FIGS. 2 and 3 works best when the programs that are decoded and displayed are relatively low bandwidth signals (e.g. Main Profile Main Level or MP@ML). If, for example, all of the three programs being decoded by the system shown in FIG. 3 were main profile high level (MP@HL) signals, the rate at which data would be provided by the three signals may prevent the AC3 decoder 122 and MPEG decoder 134 from concurrently decoding the audio and video data from multiple channels with sufficient speed to provide the full channel surfing function.

Figure 4:
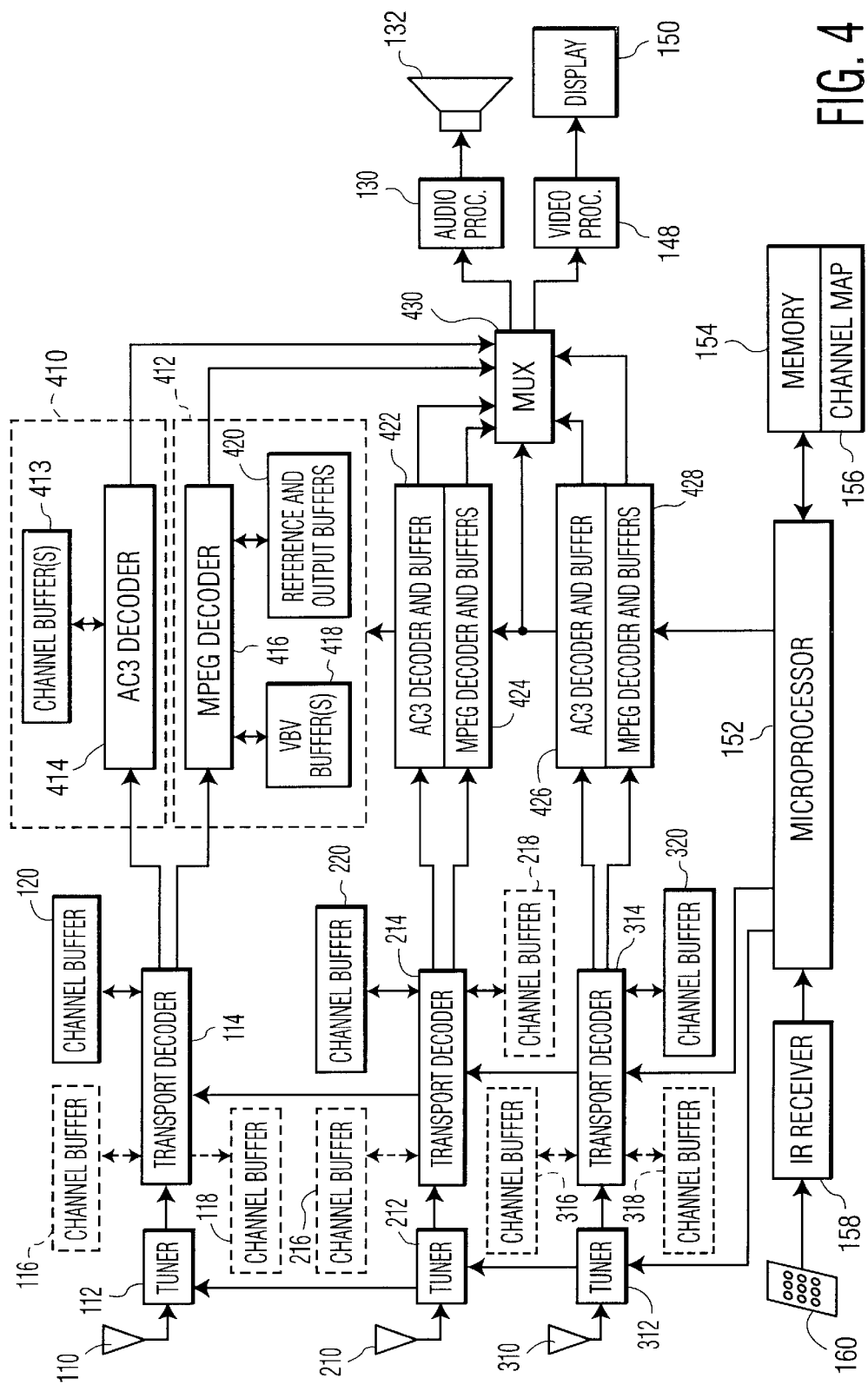
FIG. 4 is a block diagram of a television decoder system in accordance with a fourth embodiment of the invention.

FIG. 4 is a block diagram of a more robust embodiment of the invention that solves this problem. The embodiment of the invention shown in FIG. 4 includes three tuners, 112, 212 and 312, each having a respective antenna, 110, 210 and 310 and a respective transport decoder 114, 214 and 314. Each transport decoder has a channel buffer 120, 220 and 320 as well as two optional channel buffers, 116 and 118 for decoder 114; 216 and 218 for decoder 214 and 316 and 318 for decoder 314. Each transport decoder is coupled to a respective audio and video decoding system.

For the sake of simplicity details of only the audio decoding system 410 and video decoding system 412 are shown in FIG. 4. Audio decoding system 410 includes AC3 decoder 414 and one or more channel buffers 413. Video decoding system 412 includes MPEG decoder 416, one or more VBV buffers 418 and one or more sets of reference and output buffers 420. The audio decoding systems 422 and 426 are identical to the system 410 and the video decoding 424 and 428 to the system 412.

Each of the video and audio decoding systems provides a respective decoded video and audio signal to an input port of multiplexer 430. Multiplexer 430 is controlled by microprocessor 152 to direct one of the audio output signals to the audio processor 130 and one of the video output signals to the video processor 148.

In this embodiment of the invention one tuner, for example tuner 212, is controlled by the microprocessor 152 to tune to the channel that is currently being displayed. The output signal of this tuner is applied to transport decoder 214 which generates video and audio data streams for the selected channel. The audio data stream is applied to the audio decoder 422 and the video data stream is applied to the video decoder 424. The output signals of these decoders are applied to the audio processor 130 and video processor 148 through the multiplexer 430 under control of microprocessor 152. While the signal captured by tuner 212 and transport decoder 214 is displayed, tuner 112, transport decoder 114, audio decoder 410 and video decoder 412 are decoding video and audio data streams for a channel immediately above the selected channel in the channel map 156. Likewise, tuner 312, transport decoder 314, audio decoder 426 and video decoder 428 are capturing and decoding video and audio data signals for a channel immediately below the selected channel in the channel map 156.

If, in this example, the viewer presses the channel up button on the remote control unit 160, a signal is sent through the IR receiver 158 to microprocessor 152 causing the microprocessor 152 to switch the multiplexer 430 to provide the audio and video data output signals provided by audio decoder 410 and video decoder 412 to the audio processor 130 and video processor 148, respectively. At the same time, microprocessor 152 causes tuner 312 to tune to the channel above the newly selected channel in the channel map 156, so that the audio and video data streams for this channel may be decoded by transport decoder 314 and provided to audio decoder 426 and video decoder 428 respectively.

As shown in FIG. 4, each of the transport decoders includes a fixed channel buffer and two optional channel buffers. In addition, each audio decoder includes one or more channel buffers and each video decoder includes one or more VBV buffers and one or more sets of reference and output buffers.

If each of the transport decoders and audio decoders includes two channel buffers and each video includes two VBV buffers and two sets of reference and output buffers, the system shown in FIG. 4 may simultaneously decode up to six digital television signals, two minor channel signals for each of three major channels. A viewer using this system may surf between adjacent minor channels and one of the major channels or may surf between adjacent major channels. If each transport decoder and each audio decoder includes three channel buffers and each MPEG decoder includes three VBV buffers and three sets of reference and output buffers, the embodiment of the invention shown in FIG. 4 may simultaneously decode up to nine digital television programs. This configuration allows a viewer to surf both up and down by either minor channels or major channels.

Figure 5:
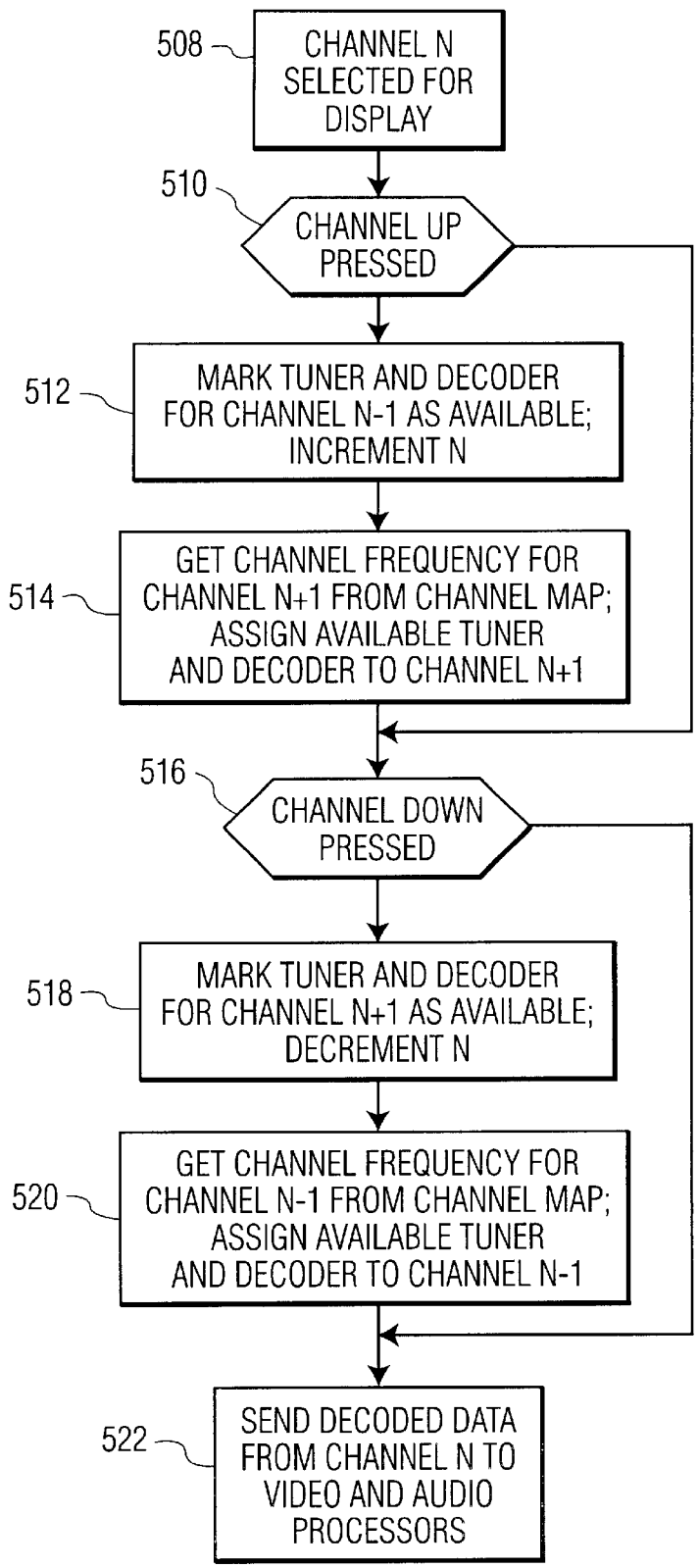
FIG. 5 is a flow chart diagram that is useful for describing the embodiment of the invention shown FIGS. 3 and 4.

FIG. 5 is a flow chart diagram that illustrates an exemplary process which may be used by the microprocessor 152 to control the apparatus shown in FIG. 4. In this process, at step 508, channel N is selected for display. At step 510, the process determines if the channel up button on the remote control 160 has been pressed. If so, step 512 is executed which marks the tuner and decoder that are currently providing audio and video data for channel N−1 as being available, and increments the variable N by one. Consequently, video and audio data from the tuner and the decoder for the next channel in the channel map are provided to the audio processor 130 and video processor 148 as the selected channel N.

Next, at step 514, the microprocessor 152 gets the channel frequency for channel N+1 from the channel map 156 and assigns the available tuner and decoder to get the television signal from channel N+1 and decode the television signal to provide audio and video data.

After step 514 or if, at step 510, it is determined that the channel up button is not pressed, step 516 is executed to determine if the channel down button has been pressed. If this button has been pressed at step 516, the process executes step 518 which marks the tuner and decoder for channel N+1 as being available and decrements N by one. This step routes the audio and video signals from the tuner and decoder handling the next lower television signal to be provided to the audio and video processors 130 and 148. Next, at step 520, the microprocessor 152 gets the channel frequency for channel N−1 from the channel map and assigns that frequency to the available tuner such that the available tuner and its corresponding decoder will provide the audio and video signals for channel N−1 in preparation for the user again pressing the channel down button.

After step 520, or if at 516, the process determines the channel down button has not been pressed, step 522 is executed which sends the decoded data from channel N to the audio processor 130 and video processor 148 respectively.

Figure 6:
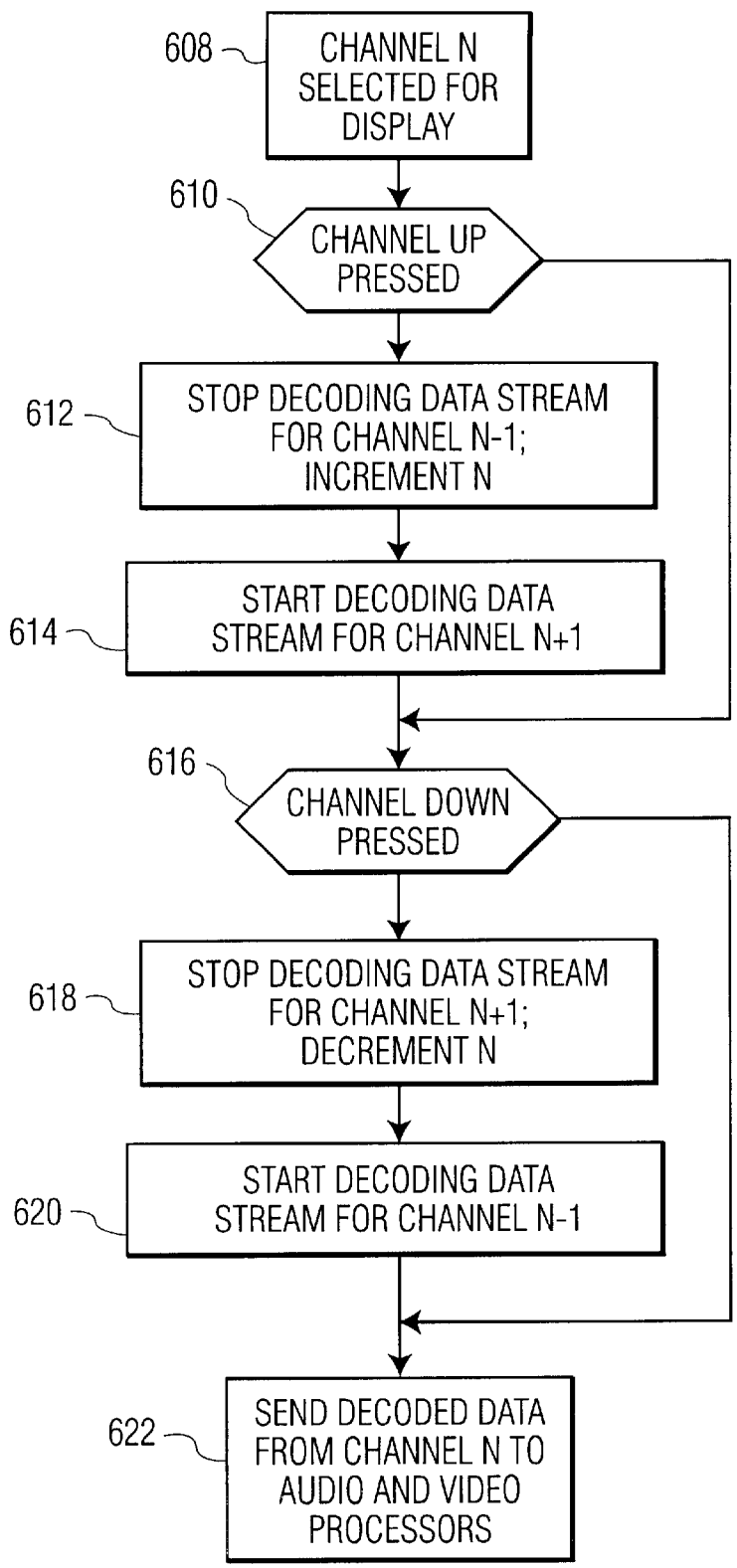
FIG. 6 is a flow chart diagram which is useful for describing the embodiments of the invention shown in FIGS. 1 through 4 or for a software implementation of the invention.

Although the embodiments of the invention described above have assumed that the decoding and surfing operations are performed using hardware elements, it is contemplated that the invention may be practiced entirely in software. FIG. 6 is a block diagram that illustrates the control of parallel processes decoding audio and video data for a plurality of parallel broadcast channels. An exemplary software embodiment may be implemented on a general-purpose computer running a multi-threaded operating system. Running in this operating system environment, are three parallel decoding processes, each of which decodes a respectivly different bit-stream into respective audio and video data. The control process selects audio data from one of these processes and provides it to a sound card (not shown) to reproduce the audio portion of the data. The control process also routes one set of decoded video data to a video display processor (not shown) and monitor (not shown) for display. The exemplary computer is also coupled to receive a plurality of data streams each representing a respective television program. These data streams may be provided, for example, from a stored set of data or from a wide band width data link (not shown). The process shown in FIG. 6 as well as the audio and video decoding processes may be implemented in software stored on a computer readable carrier such as a magnetic or optical disk or a radio frequency or audio frequency carrier wave.

The control process shown in FIG. 6 operates as follows. At step 608, channel N is selected for display. At step 610, the process determines that the viewer wishes to display the next higher channel in the channel map. At step 612, the control process terminates the decoding process which is decoding channel N−1 and increments the variable N. At step 614, the control process initiates a new process to decode data from channel N+1, retaining the process for the previously displayed channel as channel N−1. After step 614, or if at step 610, the process determines that the viewer does not want to view the next higher channel in the channel map, step 616 is executed. This step determines if the viewer wishes to view the next lower channel in the channel map. If so, step 618 is executed in which the process that is currently decoding channel N+1 is terminated and the variable N is decremented by one. Next, at step 620, the control process initiates a new process to decode the data stream for channel N−1. After step 620, or if at step 616, the process determines that the viewer does not wish to view the next lower channel, step 622 is executed which sends decoded data from channel N to the audio and video processors.

Although the invention has been disclosed in terms of exemplary embodiments it is contemplated that it may be practiced as described above within the scope of the attached claims.

What is claimed is:

1. A digital television receiver that includes a channel surfing function, the television receiver comprising:

a plurality of tuners that receive digital television signals provided by respective successive radio frequency (RF) channels and demodulate the digital television signals provided by the respective RF channels to provide a plurality of respective baseband digital television signals;

at least one transport decoder coupled to receive the plurality of respective baseband digital television signals the at least one transport decoder being configured to concurrently decode multiple transport streams in a single baseband digital television signal into respective multiple bit-streams and to provide at least one of the multiple bit-streams as an output bit-stream, wherein each concurrently decoded bit-stream provided by the at least one transport decoder represents a respectively different minor channel in the single baseband digital television signal;

at least one audio/video decoder that decodes the at least one output bit-stream provided by the plurality of transport decoders to produce respective output audio and video signals; and a microprocessor coupled to control the plurality of tuners, the at least one transport decoder, and the at least one audio/video decoder, the microprocessor reassigning one of the plurality of tuners to receive another digital television signal provided by a next respective successive RF channel responsive to the channel surfing function in preparation for a next channel selection using the channel surfing function.

2. A digital television receiver according to claim 1, wherein:

the at least one audio/video decoder consists of a single audio/video decoder; and the digital television receiver further includes a multiplexer coupled to the at least one transport decoder to select a single output bit-stream to provide to the single audio/video decoder.

3. A digital television receiver according to claim 2, wherein the plurality of tuners consists of three tuners and the at least one transport decoder consists of three transport decoders.

4. A digital television receiver according to claim 1, wherein:

the at least one audio/video decoder includes a plurality of audio/video decoders, coupled to the at least one transport decoder; and the digital television receiver further includes a multiplexer coupled to the plurality of audio/video decoders to select a single audio signal and a single video signal for presentation to a viewer.

5. A digital television receiver according to claim 4, wherein the plurality of tuners consists of three tuners, the at least one transport decoder consists of three transport decoders and the plurality of audio/video decoders consists of three audio/video decoders.

6. A digital television receiver that includes a channel surfing function, the television receiver comprising:

a plurality of tuners that each receive and demodulate a respective successive radio frequency (RF) channel to provide a respective plurality of baseband digital television signals;

a plurality of transport decoders coupled to receive the plurality of baseband digital television signals, respectively, the plurality of transport decoders each decoding at least one transport stream in a respective one of the plurality of baseband television signals to provide a respective plurality of bit-streams wherein at least one transport decoder of the plurality of transport decoders is configured to concurrently decode multiple transport streams received in a single one of the plurality of baseband digital television signals;

at least one audio/video decoder that decodes at least one bit-stream of the plurality of bit-streams to produce respective output audio and video signals; and a microprocessor coupled to control the plurality of tuners, the plurality of transport decoders, and the at least one audio/video decoder, the microprocessor reassigning one of the plurality of tuners to receive another digital television signal provided by a next respective successive RF channel responsive to the channel surfing function in preparation for a next channel selection using the channel surfing function.

7. A digital television receiver according to claim 6, wherein:

the at least one audio/video decoder consists of a single audio/video decoder; and the digital television receiver further includes a multiplexer coupled to the plurality of transport decoders to select a single output bit-stream from the multiple transport decoders to provide to the single audio/video decoder.

8. A digital television receiver according to claim 7, wherein the plurality of tuners includes two tuners and the plurality of transport decoders includes two transport decoders.

9. A digital television receiver according to claim 7, wherein the plurality of tuners consists of three tuners and the plurality of transport decoders consists of three transport decoders.

10. A method for Implementing a channel surfing function in a digital television receiver comprising the steps of:

receiving and demodulating respective television signals received via multiple successive radio frequency (RF) channels to provide multiple respective baseband digital television signals including a plurality of transport streams, wherein at least one of the baseband digital television signals includes multiple transport streams and the plurality of transport streams includes the multiple transport streams from the at least one baseband digital television signal;

concurrently decoding the plurality of transport streams to provide a respective plurality of bit-streams;

responsive to a channel surfing selection signal, selecting one of the plurality of bit-streams;

decoding the selected bit-stream to produce respective output audio and video signals; and receiving and demodulating another television signal received in another successive RF channel for concurrent decoding responsive to the channel surfing selection signal in preparation for another channel surfing selection signal.

11. A method for implementing a channel surfing function in a digital television receiver comprising the steps of:

receiving and demodulating respective television signals provided by multiple successive radio frequency (RF) channels to provide multiple respective baseband digital television signals Including a plurality of transport streams, wherein at least one of the baseband digital television signals includes multiple transport streams;

concurrently decoding the plurality of transport streams, including the multiple transport streams, to provide a respective plurality of bit-streams;

concurrently decoding the plurality of bit-streams to produce a respective plurality of output audio and video signals;

selecting one of the plurality of output audio and video signals for presentation to a viewer responsive to a channel surfing selection signal; and receiving and demodulating another respective television signal provided by another successive RF channel for concurrent decoding responsive to the channel surfing selection signal in preparation for another channel surfing selection signal.

12. A computer-readable carrier including computer program instructions, the computer program instructions causing a computer processor to implement a channel surfing function comprising the steps of:

receiving and demodulating a plurality of successive radio frequency (RF) channels to provide a respective plurality of baseband digital television signals including a respective plurality of transport streams, wherein at least one of the baseband television signals includes multiple transport streams;

concurrently decoding the plurality of transport streams, including the multiple transport streams, to provide a respective plurality of bit-streams;

responsive to a channel surfing selection signal, selecting one of the plurality of bit-streams;

decoding the selected bit-stream to produce respective output audio and video signals; and receiving and demodulating another television signal received in another successive RF channel for concurrent decoding responsive to the channel surfing selection signal in preparation for another channel surfing selection signal.

13. A computer-readable carrier including computer program instructions, the computer program instructions causing a computer processor to implement a channel surfing function comprising the steps of:

receiving multiple successive baseband digital television signals including a plurality of transport streams, wherein at least one of the received digital television signals includes multiple transport streams;

concurrently decoding the plurality of transport streams, including the multiple transport streams, to provide a respective plurality of bit-streams;

concurrently decoding the plurality of bit-streams to produce a respective plurality of output audio and video signals;

selecting one of the plurality of output audio and video signals for presentation to a viewer responsive to a channel surfing selection signal; and receiving and demodulating another respective television signal provided by another successive RF channel for concurrent decoding responsive to the channel surfing selection signal in preparation for another channel surfing selection signal.

14. A computer-readable carrier including computer program instructions, the computer program instructions causing a computer processor to implement a channel surfing function comprising the steps of:

receiving a plurality of successive baseband digital television signals including a respective plurality of transport streams, wherein one of the baseband digital television signals includes multiple transport streams;

concurrently decoding the plurality of transport streams, including the multiple transport streams, to provide a respective plurality of bit-streams;

concurrently decoding the plurality of bit-streams to produce a respective plurality of output audio and video signals;

selecting one or the plurality of output audio and video signals for presentation to a viewer responsive to a channel surfing selection signal; and receiving and demodulating another respective television signal provided by another successive RF channel for concurrent decoding responsive to the channel surfing selection signal in preparation for another channel surfing selection signal.

* * * * *